(12) United States Patent
Matlschweiger et al.

(10) Patent No.: US 9,787,883 B2
(45) Date of Patent: Oct. 10, 2017

(54) TEST DEVICE FOR CARRYING OUT EXAMINATIONS ON A TEST BODY

(71) Applicant: FronTone GmbH, Feldkirchen bei Graz (AT)

(72) Inventors: Klaus Matlschweiger, Fernitz (AT); Michael Roller, Neuweiler-Oberkollwangen (DE); Bernhard Glaser, Mötzingen (DE); Helmut Ruoff, Bad Imnau (DE)

(73) Assignee: Frontone GmbH, Feldkirchen Bei Graz (AT)

( * ) Notice: Subject to any disclaimer, the term of this patent is extended or adjusted under 35 U.S.C. 154(b) by 178 days.

(21) Appl. No.: 14/889,616

(22) PCT Filed: May 7, 2014

(86) PCT No.: PCT/EP2014/059304
§ 371 (c)(1),
(2) Date: Nov. 6, 2015

(87) PCT Pub. No.: WO2014/180883
PCT Pub. Date: Nov. 13, 2014

(65) Prior Publication Data
US 2016/0119511 A1   Apr. 28, 2016

(30) Foreign Application Priority Data
May 8, 2013   (DE) .......................... 10 2013 007 882

(51) Int. Cl.
*H04N 9/47*       (2006.01)
*H04N 5/225*      (2006.01)
(Continued)

(52) U.S. Cl.
CPC ........ *H04N 5/2252* (2013.01); *G01M 17/007* (2013.01); *G01M 17/0078* (2013.01); *H04N 7/18* (2013.01)

(58) Field of Classification Search
CPC ............ G01M 17/007; G01M 17/0078; H04N 5/2252; H04N 7/18
(Continued)

(56) References Cited

U.S. PATENT DOCUMENTS

2012/0186369 A1*  7/2012  Matlschweiger . G01M 17/0078
                                                        73/865.3
2014/0250997 A1*  9/2014  Sprenger ............. G01M 17/007
                                                        73/146

FOREIGN PATENT DOCUMENTS

DE    102008039400 A1    2/2010
DE    102009021686 A1    11/2010
(Continued)

OTHER PUBLICATIONS

English translations of the Abstracts of the cited Foreign Patent Documents.

*Primary Examiner* — Robert Chevalier
(74) *Attorney, Agent, or Firm* — Robert A. Blaha; Smith Tempel Blaha LLC

(57) ABSTRACT

A testing device for carrying out investigations on a test body, which testing device comprises a rail guide with a slide unit coupled to a drive unit for acceleration, on which slide unit the test body is arranged, wherein the drive unit is connected to a control unit and at least one image capturing unit is provided for capturing image data of the test body. The at least one image capturing unit is arranged on a further slide unit, which is arranged on a further rail guide running parallel to the rail guide of the slide unit of the test body, wherein the further slide unit of the at least one image capturing unit comprises a separate drive unit for acceler-
(Continued)

ating the further slide unit, which drive unit is connected to the control unit. Further, embodiments of the invention relate to a use of such a testing device.

4 Claims, 3 Drawing Sheets

(51) Int. Cl.
*G01M 17/007* (2006.01)
*H04N 7/18* (2006.01)

(58) Field of Classification Search
USPC .................. 348/143, 148, 135, 140, 142
See application file for complete search history.

(56) References Cited

FOREIGN PATENT DOCUMENTS

| EP | 0384020 A2 | 8/1990 |
| EP | 2402227 A1 | 1/2012 |
| WO | WO2011020868 A2 | 2/2011 |

* cited by examiner

Stand der Technik

TEST DEVICE FOR CARRYING OUT EXAMINATIONS ON A TEST BODY

CROSS-REFERENCE TO RELATED APPLICATION

This application claims the benefit of the filing date of German Patent Application No. 10 2013 007 882.2 filed 8 May 2013, the disclosure of which is hereby incorporated herein by reference.

TECHNICAL FIELD

Embodiments of the invention relate to a testing device for carrying out investigations on a test body, the testing device comprising a rail guide with a slide unit coupled to a drive unit for acceleration, at which slide unit the test body is arranged, wherein the drive unit is connected to a control unit and at least one image capturing unit is provided for capturing image data of the test body.

TECHNOLOGICAL BACKGROUND

A device for investigating a test body is known from WO 2011/020868 A2. The device comprises a receiving unit for a fixed arrangement of the test body during the entire investigation, an electrical drive unit for driving the receiving unit with the test body, and a control unit for controlling the electrical drive unit for accelerating the test body arranged on the receiving unit. The device is constructed in such a manner that the receiving unit and the test body located thereon are driven mechanically exclusively by means of the electrical drive unit, wherein the electrical drive unit comprises an electrical linear motor. Furthermore, the device comprises an analysis unit, which comprises a camera for capturing images or videos for subsequent evaluation.

SUMMARY OF THE INVENTION

There may be a need for specifying an improved testing device compared to the prior art for carrying out investigations on a test body.

This need may be solved by means of the features specified in claim 1.

Advantageous embodiments of the invention are the subject of the dependent claims.

A testing device for carrying out investigations on a test body comprises a rail guide with a slide unit coupled to a drive unit for acceleration, at which slide unit the test body is arranged, wherein the drive unit is connected to a control unit and at least one image capturing unit is provided for capturing image data of the test body. According to embodiments of the invention the at least one image capturing unit is arranged at a further slide unit, which is arranged on a further rail guide running parallel to the rail guide of the slide unit of the test body, wherein the further slide unit of the at least one image capturing unit comprises a separate drive unit for accelerating the further slide unit, which drive unit is connected to the control unit.

Because of the matter of fact that the at least one image-capturing unit is arranged at the further slide unit, which can be driven by means of the separate drive unit, it is possible in a particularly advantageous manner to reduce a weight for accelerating the test body by the weight of a framework, which is known from the prior art and which is also conveyed at the slide, at which framework the image capturing unit is fastened. Due to this weight reduction, an additional power of the testing device is available, so that specific crash pulses acting on a vehicle can be simulated. As a result, it is possible to improve the safety of vehicles that are in development, particularly for vehicle occupants.

Because of the elimination of the weight of the framework for the image capturing unit additionally a simulation quality and reproducibility of the testing device can be increased, as by means of the provided solution vibrations introduced into the testing device by the accompanying framework with the image capturing unit are eliminated.

DETAILED DESCRIPTION OF EXEMPLARY EMBODIMENTS

Exemplary embodiments of the invention are explained in more detail in the following on the basis of drawings.

Parts which correspond to one another are provided with the same reference numbers in all figures.

Figure 1:
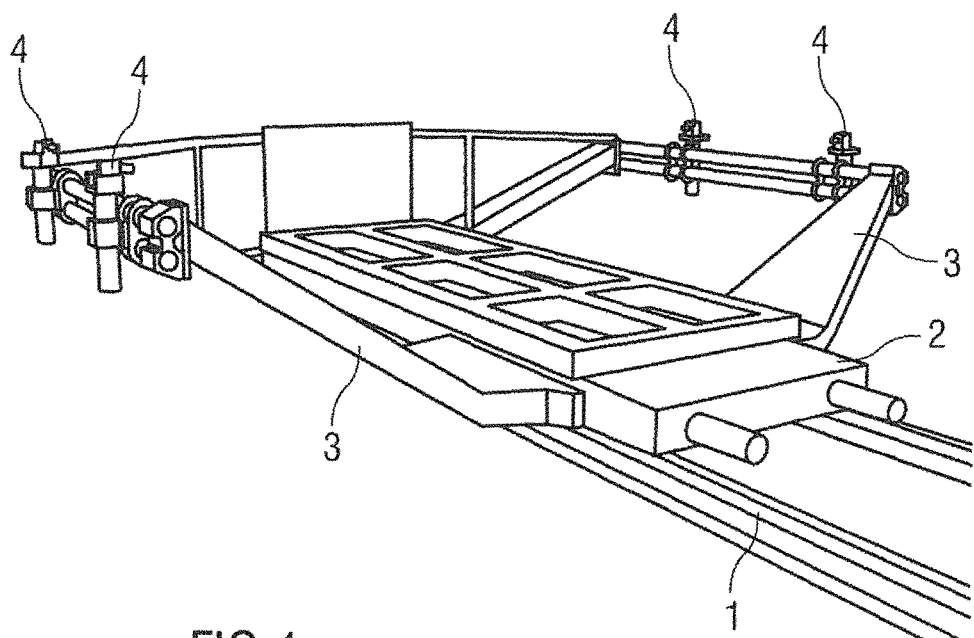
FIG. 1 schematically shows a perspective view of a testing device according to the prior art, FIG. 2 schematically shows a separate camera slide in a perspective view, and FIG. 3 schematically shows the testing device with the separate camera slide in a perspective view.

FIG. 1 shows a testing device for carrying out investigations on a test body according to the prior art, which test body is not illustrated in any more detail.

The testing device comprises a rail guide 1 and a slide unit 2 arranged on the same, which slide unit 2 is coupled to a drive unit which is not shown. The slide unit 2 can be moved on the rail guide 1 by means of the drive unit, wherein the slide unit 2 can be accelerated and braked by means of the drive unit. The drive unit is connected to a control unit, the generated control signals of which can be supplied to the drive unit, so that the slide unit 2 is accelerated or braked.

A framework 3 is laterally arranged and fixed at the slide unit 2 in each case, wherein two image capturing units 4 are fastened at the respective framework 3.

A testing device of this type is provided for collision simulation of a vehicle body, wherein the test body arranged at the slide unit 2 is a vehicle body with at least one crash test dummy, which constitutes a mockup of a vehicle occupant. The test body can be accelerated with an inverse crash pulse by means of the slide unit 2, in order to simulate the same process for vehicle occupants as in a collision of a vehicle. The movement of the at least one crash test dummy resulting from the simulation of the crash pulse can be captured by means of the image capturing units 4, which are constructed as high-speed video cameras.

As described above, the frameworks 3 are arranged and fixed at the slide unit 2, so that the image capturing units 4 move with the slide unit 2.

These frameworks 3 have a weight, which must also be accelerated in addition to the weight of the slide unit 2 and the test body, so that, owing to the thus comparatively high total weight, at least to some extent, it is not possible to simulate specific vehicle crash pulses. In other words, a power of the testing device is not sufficient for the high mass to be accelerated.

In order to be able to simulate these specific vehicle crash pulses and thus to be able to undertake investigations on the test body, a further rail guide 5 is provided for the image-capturing units 4.

Figure 2:
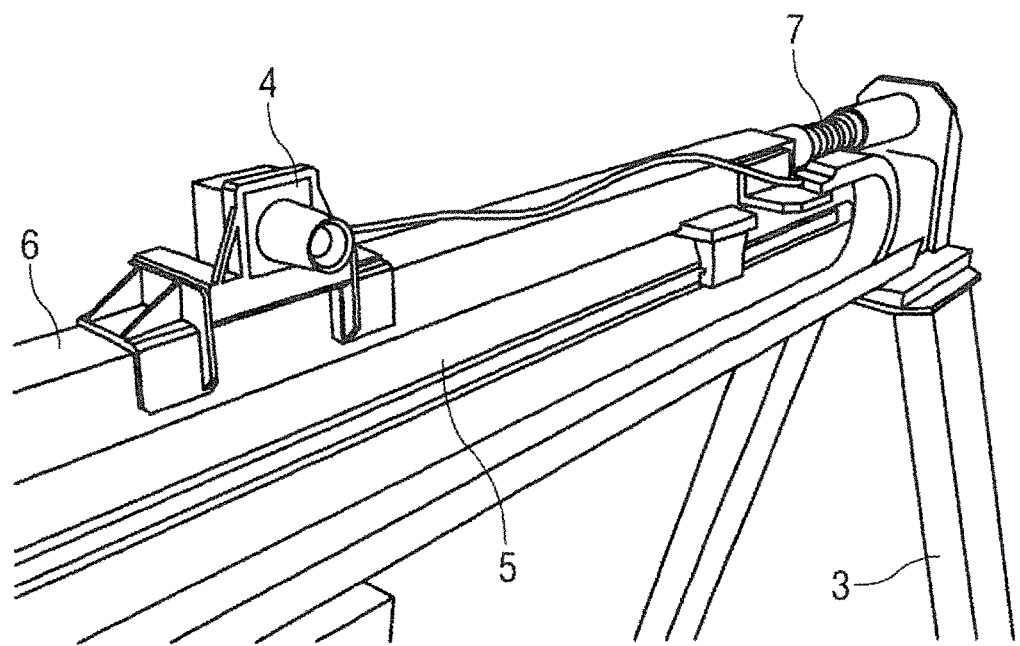
Figure 3:
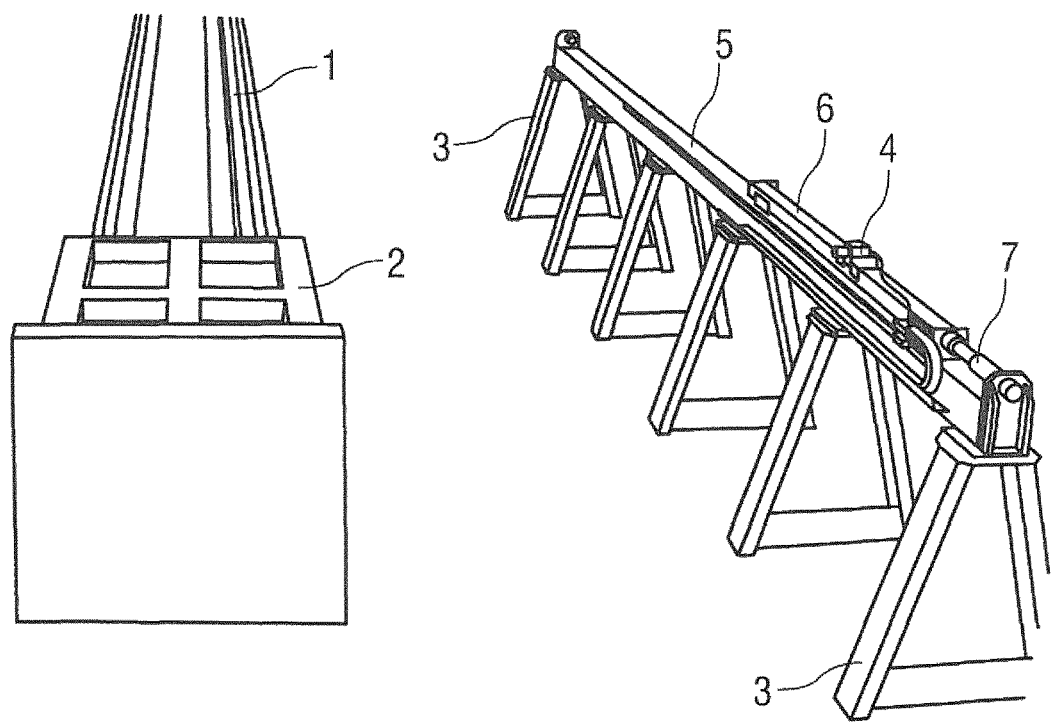

A section of the further rail guide 5 is illustrated in FIG. 2 and the entire testing device with the further rail guide 5 is illustrated in FIG. 3.

FIG. 2 shows the further rail guide 5 for a further slide unit 6, at which an image capturing unit 4 is arranged, in detail in a perspective view. The further slide unit 6 is used as a support of the image capturing unit 4 and, for accelerating the same, is coupled to a separate drive unit 7. This separate drive unit 7 is an electromagnetic drive. As shown in FIG. 3, the further rail guide 5 is arranged parallel next to the rail guide 1 of the test body, as a result of which it is possible to locate the test body and the image capturing unit 4 at an identical height and it is possible that corresponding image data can be captured.

In order to realize that the slide unit 2 with the test body and the further slide unit 6 with the image capturing unit 4 can be accelerated and braked in a synchronous manner, that is to say that they are controllable in a synchronous manner, the separate drive unit 7 is likewise connected to the control unit for controlling the drive unit, by means of which the slide unit 2 of the test body can be controlled.

A sampling of a signal at the slide unit 2 with the test body arranged thereon preferably takes place by means of a high resolution incremental encoder and/or laser. In addition, it is possible to implement a predetermined simulated crash pulse in digital form, that is to say in data form, in a control software of the further slide unit 6. A trigger signal from the control software for accelerating the slide unit 2 of the test body is then sent for synchronization to the control software of the further slide unit 6.

In one possible configuration, two further rail guides 5 are provided, with one further slide unit 6 in each case. In this case, one further rail guide 5 in each case is arranged parallel next to the rail guide 1 of the slide unit 2 of the test body, so that the rail guide 1 of the test body is located between the two further rail guides 5 for the image capturing units 4. As a result, a movement of the test body can be captured by means of the image capturing units 4 from both sides of the test body.

By means of an accordingly configured guidance of the image capturing units 4 for capturing a movement of the test body, in particular of the vehicle body with a crash test dummy, resulting from the simulated vehicle collision, it is possible to simulate specific crash pulses because the weight of the testing device for accelerating the test body is reduced by the weight of the framework 3 for the arrangement of the image capturing units 4. Due to the weight reduction, a power of the testing device is sufficient for a mass to be accelerated, which is formed by the slide unit 2 and the test body.

The invention claimed is:

1. A testing device for carrying out investigations on a test body, the testing device comprising:
a rail guide with a slide unit coupled to a drive unit for acceleration, at which slide unit the test body is arranged,
wherein the drive unit is connected to a control unit and at least one image capturing unit is provided for capturing image data of the test body, characterized in that the at least one image capturing unit is arranged at a further slide unit which is arranged on a further rail guide running parallel to the rail guide of the slide unit of the test body,
wherein the further slide unit of the at least one image capturing unit comprises a separate drive unit for accelerating the further slide unit, which drive unit is connected to the control unit.

2. The testing device as set forth in claim 1, characterized in that the separate drive unit is an electromagnetic drive.

3. The testing device as set forth in claim 1, characterized in that the separate drive unit can be controlled in such a manner that a movement of the further slide unit can be carried out synchronously to the movement of the slide unit of the test body.

4. A method for simulating and evaluating a vehicle collision, the method comprising:
arranging a test body on a slide unit coupled to a first drive unit, where the slide unit is arranged on a first rail guide;
arranging at least one image capturing unit on a further slide unit arranged on a further rail guide running parallel to the first rail guide, the further slide unit coupled to a separate drive unit;
using the first drive unit to accelerate the slide unit;
using the separate drive unit to accelerate the further slide unit; and
capturing at least one image with the image capturing unit.

* * * * *